Feb. 2, 1937. A. E. NAVE Re. 20,259

WATER COOLER

Original Filed Jan. 30, 1931 2 Sheets-Sheet 1

INVENTOR,
Alfred E. Nave
BY
Wm. T. Hedlund
his ATTORNEY.

Feb. 2, 1937. A. E. NAVE Re. 20,259

WATER COOLER

Original Filed Jan. 30, 1931 2 Sheets-Sheet 2

INVENTOR,
Alfred E. Nave
BY
Jno. A. Hedlund
his ATTORNEY.

Reissued Feb. 2, 1937 Re. 20,259

UNITED STATES PATENT OFFICE 20,259

WATER COOLER

Alfred E. Nave, Evansville, Ind., assignor to Servel Inc., New York, N. Y., a corporation of Delaware Original No. 1,854,995, dated April 19, 1932, Serial No. 512,316, January 30, 1931. Application for reissue October 5, 1936, Serial No. 104,030

7 Claims. (Cl. 62—141)

This invention relates to refrigeration apparatus designed to cool liquids such as drinking water or the like.

It is an object of the invention to provide an apparatus of this character which is inexpensive to manufacture and in which the refrigerating mechanism is easily made accessible for servicing or if for other reason the same becomes desirable.

The present invention contemplates the provision of a skeleton structure containing the necessary mechanism for producing refrigeration, an insulated receptacle for containing the liquid to be cooled, and a separately complete casing or cabinet adapted to be slipped down over such skelton structure.

Figure 1:
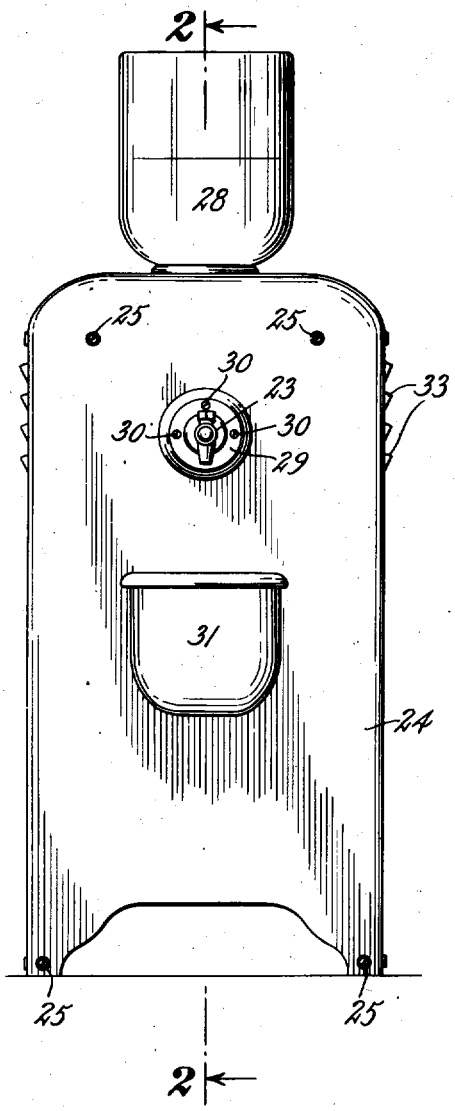
Figure 2:
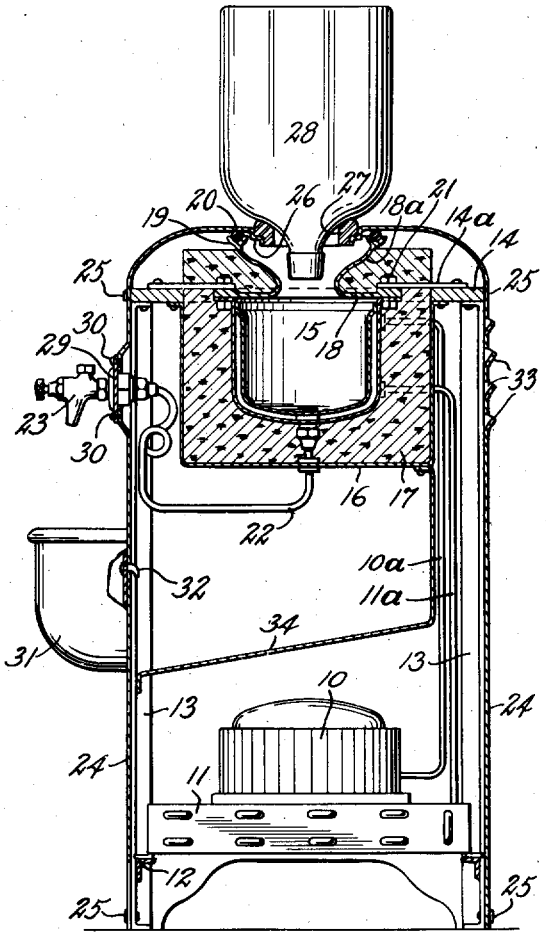
Figure 3:
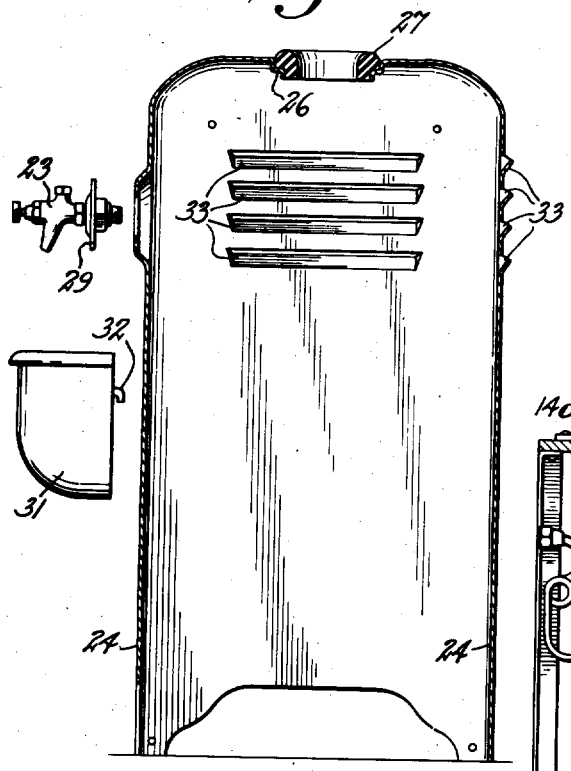
Figure 4:
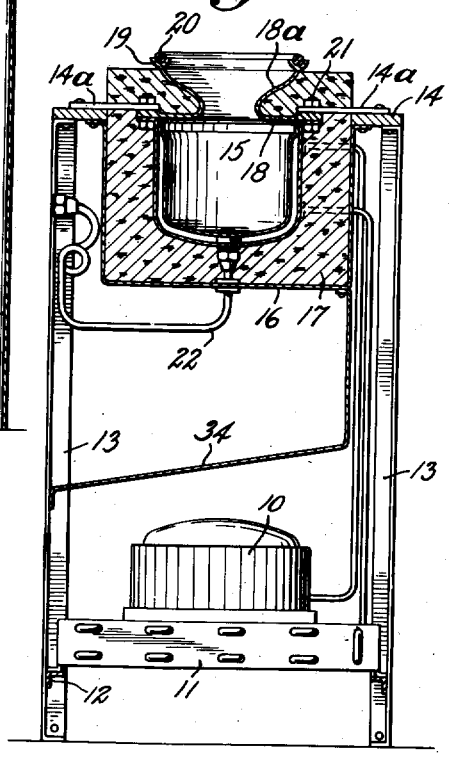

Further objects and advantages will be apparent from the following description taken in connection with the accompanying drawings wherein Fig. 1 is a front elevation illustrating one application of the invention;

Fig. 2, a vertical section on the line 2—2 of Fig. 1,

Fig. 3, a vertical section of the casing with faucet and drip pan disconnected; and Fig. 4, a vertical section through the unit with the casing removed.

Referring to the drawings, a refrigerating unit 10, which, for the purpose of illustration may be an hermetically sealed unit including a motor driven compressor, is mounted with a condenser 11 upon a frame 12 of angle iron or the like and such frame is supported at each of its four corners by an upright post or angle 13, said angles extending from the floor to the upper part of the cabinet. An upper frame 14 is supported by the upper ends of the corner posts 13 and such upper frame 14 includes horizontally disposed frame members of wood or like material.

An evaporator 15 is suspended from the upper frame 14 by means of brackets 14a. This evaporator consists of inner and outer shells the interior of which forms a container or reservoir for water or other substance to be refrigerated. The space between the shells of the evaporator 15 may be supplied with liquid refrigerant from the condenser 11 in the usual manner through a connection 11a including a capillary tube, expansion valve or the like, not shown, and vaporous refrigerant may be withdrawn from said space through a suction line 10a which connects with the unit 10.

A sheet metal casing or housing 16 is supported from the underside of the upper frame 14 and encloses insulation 17 disposed around the evaporator shell 15. The amount of insulation for the water cooler is consequently materially reduced.

If the cooler is to be used for cooling water, either a bottle or demijohn may be used for supplying water to the receptacle formed by the evaporator shell or the device may be connected directly with the city water supply. If a bottle is used, the receptacle 15 is covered with a plate 18 provided with a throat or upwardly extending portion 18a for receiving the neck of the bottle, the upper extremity of said throat being provided with an annular groove or recess 19 adapted to receive a gasket 20 of rubber or other soft material. The plate or head 18 may be secured in position in any desired manner, in the present instance bolts 21 being employed, and by means of these bolts the connecting brackets 14a and the evaporator shell are rigidly connected. In order to withdraw liquid from the reservoir 15, a discharge pipe 22 has one end connected to the lower central portion of the same and has its outer end provided with a faucet 23.

The above described construction constitutes an operative refrigerating unit for cooling liquid and the parts are exposed and readily accessible for examination or service.

A suitable casing for the above described mechanism consists of an easily detachable shell 24 of metal or like material slipped down over the entire framework until it rests upon the gasket 20 after which it may be secured in position by means of screws or other fastening elements 25. The shell 24 is provided in the central portion of its top with an opening surrounded by a flange 26 in which is disposed a gasket 27 upon which rests a bottle 28. If it is not desired to use a bottle, a solid head, not shown, may be used in lieu of the head 18. Also, with a solid head, the opening in the upper portion of the shell may be dispensed with or may be covered by a suitable cover.

The shell 24 is provided in its front with an opening through which the outer ends of the tubing 22 projects. Through this opening the outer end of the tubing may be pulled, and the tubing is provided with one or more extra turns to facilitate such manipulation. When pulled out, the end of the tubing is accessible for the attachment of the faucet.

In the construction shown, a plate 29 is attached to the faucet and this plate is secured to the casing by means of screws or other fastening elements 30. This construction permits the utilization of a faucet which is larger than the opening through which the tubing projects.

However, if desired, a smaller faucet might be employed and instead of the plate 28 being attached to the outside of the shell or casing, it might be attached against the inside and such construction is contemplated by the invention.

A drip basin 31 is mounted below the faucet 24 and is detachably connected to the casing by means of a hook 32 which projects through an opening in the front of the casing. This permits the drip basin to be removed when it is desired to empty its contents.

In order to increase the efficiency of the condenser 11, the cabinet is closed except at the bottom beneath the condenser and adjacent its top where it is provided with louvres 33 so that air may pass upwardly through the condenser and into the shell and escape through the louvres 33. In order to provide a flue, a plate 34 may be provided in spaced relation to the rear wall of the casing and giving a substantial length to the air passage along the rear of the casing.

It will be obvious to those skilled in the art that various changes may be made without departing from the spirit of the invention and the invention is not limited to what is shown in the drawings and described in the specification but only as indicated in the appended claims.

I claim:

1. A device of the class described, comprising a frame structure, an evaporator supported by said frame structure, a refrigerating unit for cooling said evaporator, a jacket of insulation around the evaporator, and a detachable separately complete shell adapted to be slipped down over and enclose the frame structure, refrigerating unit and evaporator.

2. In a liquid cooling apparatus, a frame, an evaporator and a refrigerating unit mounted on said frame, and a separately complete detachable casing adapted to be slipped down over and enclose said frame, refrigerating unit and evaporator.

3. In a liquid cooling apparatus, a skeleton frame having mounted thereon a refrigerating apparatus, and a separately complete detachable shell adapted to be slipped down over and enclose said skeleton frame.

4. In a liquid cooling apparatus, a skeleton frame having mounted thereon a refrigerating apparatus, and a detachable shell enclosing said skeleton frame, said shell having an opening in its front, a detachable plate for closing said opening and a connection to said plate for permitting the discharge of liquid therethrough.

5. In a liquid cooling apparatus, a skeleton structure including a reservoir for liquid to be cooled, a casing for said skeleton structure having an opening therein, a closure for said opening, a flexible connection from the rear side of said plate to said reservoir, and a faucet mounted in the front of said plate.

6. A water cooler comprising a skeleton frame structure supporting an evaporator, forming a reservoir, and a condenser, a unitary shell for said skeleton structure, and means cooperating with said shell to provide a flue, so that air may pass into the shell, through the condenser, and be discharged from a portion of the shell remote from that portion of the shell at which the said air may enter.

7. A water cooler comprising a skeleton frame structure and including an evaporator forming a reservoir, a condenser, a casing for said skeleton structure, means co-operating with said casing to provide a flue so that air will pass into the casing through the condenser and be discharged from a remote portion of the casing, and a flexible faucet connection from said reservoir through said casing.

ALFRED E. NAVE.